(12) United States Patent
Fujikura et al.

(10) Patent No.: US 6,418,209 B1
(45) Date of Patent: Jul. 9, 2002

(54) TELECOMMUNICATIONS DEVICE EQUIPPED WITH IN-CALL INCOMING CALL NOTIFICATION FUNCTION AND METHOD FOR DETECTING IN-CALL INCOMING SIGNAL NOTIFICATION

(75) Inventors: Toshiaki Fujikura; Yoichi Harada; Masahito Asa, all of Tokyo (JP)

(73) Assignee: Uniden Corporation, Tokyo (JP)

( * ) Notice: Subject to any disclaimer, the term of this patent is extended or adjusted under 35 U.S.C. 154(b) by 0 days.

(21) Appl. No.: 09/138,008

(22) Filed: Aug. 21, 1998

Related U.S. Application Data
(60) Provisional application No. 60/056,504, filed on Aug. 21, 1997.

(51) Int. Cl.[7] ............................. H04M 1/56; H04M 3/42
(52) U.S. Cl. ............................. 379/142.08; 379/215.01
(58) Field of Search ................................. 379/215, 142, 379/372, 373, 376, 142.08, 215.01

(56) References Cited

U.S. PATENT DOCUMENTS

| 3,133,995 | A | 5/1964 | Zarouni |
| 3,584,156 | A | 6/1971 | Beth |
| 3,727,003 | A | 4/1973 | Paraskevakos |
| 3,787,626 | A | 1/1974 | Subieta |
| 3,812,296 | A | 5/1974 | Paraskevakos |
| 3,963,874 | A | 6/1976 | Pommerening et al. |
| 3,997,731 | A | 12/1976 | Wilmot et al. |
| 4,661,975 | A | 4/1987 | Brecher |

(List continued on next page.)

FOREIGN PATENT DOCUMENTS

| JP | 6-111365 | 9/1981 |
| JP | 63-9260 | 1/1988 |
| JP | 3-101355 | 4/1991 |
| JP | 4-212556 | 8/1992 |
| JP | 5-63815 | 3/1993 |
| JP | 5-199304 | 8/1993 |
| JP | 5-327891 | 12/1993 |
| JP | 7-235988 | 9/1995 |

OTHER PUBLICATIONS

"LSSGR: Voiceband Data Transimission Interface Section 6.6", Bellcore, GR–30–CORE, Issue 1, Dec. 1994.
"CMOS MT8843: Calling Number Identification Circuit 2", MITEL, Issue 2, Mar. 1996, pp. 5–1 –5–20.

Primary Examiner—Richemond Dorvil
Assistant Examiner—A. Armstrong
(74) Attorney, Agent, or Firm—McDermott, Will & Emery

(57) ABSTRACT

The present invention has the purpose of realizing an infallible in-call incoming signal notification incoming signal notification service with this erroneous action eliminated to the extent possible.

The telecommunications device equipped with an in-call incoming signal notification function relating to the present invention is equipped with the following: a microphone to transmit voice signals to a line; an earphone to receive voice signals from the line and convert them to voice; an in-call incoming signal notification signal sampler to sample this signal when an in-call incoming signal notification signal is included in the line; a response signal emitter to send a response signal for the in-call incoming signal notification signal to the line; a microphone signal detector to detect whether the transmitter has sent voice signals to the line; an earphone signal detector to detect whether the earphone has received voice signals from the line; and a control portion to analyze the sampled signal from the in-call incoming signal notification signal sampler based on the detected signals of the microphone signal detector and the earphone signal detector and determine the presence of the in-call incoming signal notification signal, as well as causing the response signal emitter to send a response signal when it is determined that an in-call incoming signal notification signal is present and to acquire information from the line.

5 Claims, 7 Drawing Sheets

U.S. PATENT DOCUMENTS 4,873,719 A      10/1989  Reese
5,519,774 A  *   5/1996   Battista et al. ............... 379/386
5,649,002 A  *   7/1997   Brady et al. ................. 379/142
5,862,210 A  *   1/1999   Irie et al. .................... 379/215
5,926,541 A  *   7/1999   Irie et al. .................... 379/372
5,974,138 A  *  10/1999   Sambhwani et al. ........ 379/373

* cited by examiner

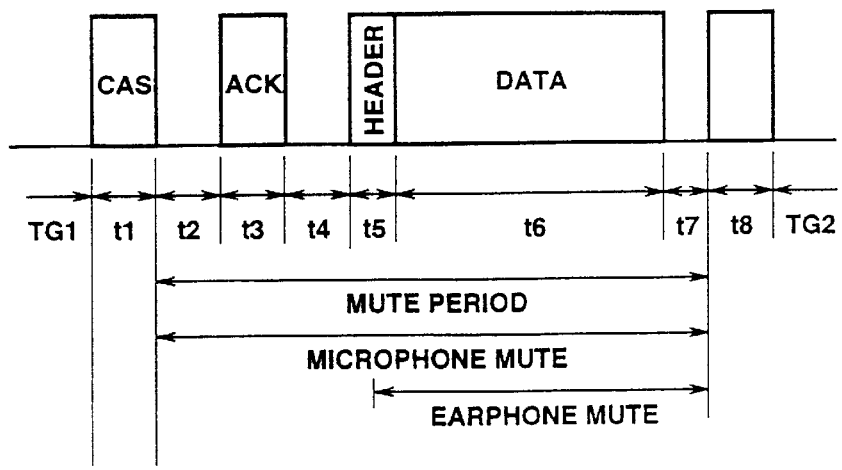
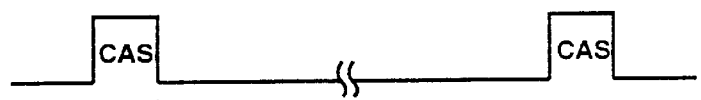
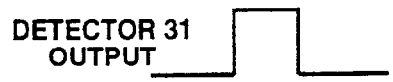
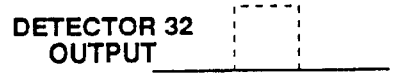
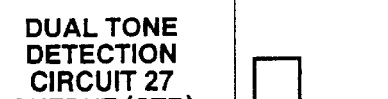

TELECOMMUNICATIONS DEVICE EQUIPPED WITH IN-CALL INCOMING CALL NOTIFICATION FUNCTION AND METHOD FOR DETECTING IN-CALL INCOMING SIGNAL NOTIFICATION

This application claims priority from provisional patent application Serial No. 60/056,504, filed Aug. 21, 1997 and entitled "Telecommunications Device Equipped With In-Call Incoming Call Notification Function And Method For Detecting In-Call Incoming Signal Notification", which is incorporated herein by reference.

BACKGROUND OF THE INVENTION

1. Field of the Invention

The present invention generally relates to a telephone subscriber service, especially an improved mode of a call waiting (in-call incoming signal notification or catch-phone) service including the sending of a third subscriber's origination number when a phone is in an off-hook state.

2. Description of the Related Art

Telecommunications devices equipped with an in-call incoming signal notification (CW) function are known. In the in-call incoming signal notification service, a first subscriber receives a specific in-call incoming signal notification tone when the first subscriber who subscribes to this service is on the phone with a second subscriber and a third subscriber calls the first subscriber. When the first subscriber receives a call from a third subscriber, the first subscriber quickly depresses the hook switch and the first subscriber's line is switched to the third subscriber, while the second subscriber's line is put on hold. If the first subscriber ignores the in-call incoming signal notification tone then a second in-call incoming signal notification tone is sent again several seconds later. When the first subscriber ignores this second in-call incoming signal notification tone a busy signal is sent to the third subscriber.

Literature disclosing this type of technology includes U.S. Pat. Nos. 3,133,995, 3,584,156, 3,963,874, 3,997,731, 4,661,975. Also, there is a caller's number identification (CNID) service to make a notification of information such as another party's number, as well as sending a in-call incoming signal notification tone to the first subscriber. Literature disclosing this type of technology includes U.S. Pat. Nos. 3,727,003, 3,787,626, 3,812,296.

Belcore Company's technology standard TR-TSY-00030 and 00031 might be used for data transmission systems and protocols necessary for realizing this CNID device. In these specs, the use of modem data (frequency shift keying, FSK) is required to transmit an identification signal from the central telephone exchange to the subscriber's device, during the silent period between a first call signal and a second call signal.

Furthermore, U.S. Pat. No. 4873719 is another patent relating to caller's number identification. In this patent, CNID is issued individually. This problem is resolved by the exclusive control of the sending of the caller's identification number being authorized by the receiver. This patent uses the conventional in-call incoming signal notification tone and sends the caller identification information using a dual tone multi frequency data signal while the called party's [phone] is off the hook.

In telephone service, the line enters a busy state when the hook switch is off hook and the subscriber can talk with another party through the earphone and microphone. In the CALLER ID on CALL WAITING service, however, a two tone signal informs [the subscriber] of an incoming call from a third party through the earphone. Also, provisions are made to detect this two tone signal with a two tone detection circuit, process [this] with a microcomputer, and return a signal from the DTMF generator, in order for the reception of data such as a third party's name and telephone number.

However, it is undeniable that there is some chance of a signal having the same frequency components as this two tone [sic] being intermixed. The voice of the other party, who is the second party, from the telephone line and the voice of one's own voice, as the first party, from the mike are no exception. For this reason, one must also consider that the two tone detection circuit works in error due to these voices and mistakenly determines that a signal to notify of an incoming call from a third party has been received.

SUMMARY OF THE INVENTION

The present invention has the purpose of realizing an infallible in-call incoming signal notification incoming signal notification service with this erroneous action eliminated to the extent possible.

The telecommunications device equipped with an in-call incoming signal notification function relating to the present invention is equipped with the following: a microphone to transmit voice signals to a line; an earphone to receive voice signals from the line and convert them to voice; an in-call incoming signal notification signal sampler to sample this signal when an in-call incoming signal notification signal is included in the line; a response signal emitter to send a response signal for the in-call incoming signal notification signal to the line; a microphone signal detector to detect whether the transmitter has sent voice signals to the line; an earphone signal detector to detect whether the earphone has received voice signals from the line; and a control portion to analyze the sampled signal from the in-call incoming signal notification signal sampler based on the detected signals of the microphone signal detector and the earphone signal detector and determine the presence of the in-call incoming signal notification signal, as well as causing the response signal emitter to send a response signal when it is determined that an in-call incoming signal notification signal is present and to acquire information from the line.

In the telecommunications device equipped with an in-call incoming signal notification function relating to the present invention, the control portion determines that there is no in-call incoming signal notification signal regardless of the sampled signal of the in-call incoming signal notification signal sampler, when the microphone signal detector detects voice signals and the earphone signal detector does not detect voice signals, and determines that there is an in-call incoming signal notification signal when both the microphone signal detector and the earphone signal detector do not detect voice signals and the sampled signal of the in-call incoming signal notification signal sampler is output.

The method for detecting in-call incoming signal notification relating to the present invention is a method for detecting in-call incoming signal notification for the telecommunications device of the first subscriber to attain identification information of a third subscriber when a first subscriber is talking with a second subscriber via an converter comprising: a process to sample this signal when an in-call incoming signal notification signal is included in a line; a process to detect whether a microphone sent a voice signal to a line; a process to detect whether an earphone received a voice signal from the line; a process to analyze the sampled signal sampled in the process for extracting based on the detection results of the process for detecting microphone signals and the process for detecting earphone signals and to determine whether an in-call incoming signal notification signal is present; a process to send a response signal for the in-call incoming signal notification signal to the line when it was determined that the in-call incoming signal notification signal is present; and a process to acquire information from the line.

The telecommunications device equipped with an in-call incoming signal notification function relating to the present invention is equipped with the following: a microphone to transmit voice signals to a line; an earphone to receive voice signals from the line and convert them to voice; an in-call incoming signal notification signal sampler to sample this signal when an in-call incoming signal notification signal is included in the line; a response signal emitter to send a response signal for the in-call incoming signal notification signal to the line; and a control portion to determine that an in-call incoming signal notification signal is present when the in-call incoming signal notification signal sampler outputs the sampled signal multiple times within a prescribed period of time, to cause the response signal emitter to send a response signal, and to acquire information from the line.

The method for detecting in-call incoming signal notification relating to the present invention is a method for detecting in-call incoming signal notification for the telecommunications device of the first subscriber to attain identification information of a third subscriber when a first subscriber is talking with a second subscriber via an converter comprising: a process to sample this signal when an in-call incoming signal notification signal is included in a line; a process to determine whether an in-call incoming signal notification signal is present when the in-call incoming signal notification signal is sampled multiple times within a prescribed time period; a process to send a response signal for the in-call incoming signal notification signal to the line when it was determined that the in-call incoming signal notification signal is present; and a process to acquire information from the line.

The telecommunications device equipped with the in-call incoming signal notification function relating to the present invention is equipped with the following: a microphone to send voice signals to a line; an earphone to receive voice signals from the line and convert them to voice; an in-call incoming signal notification signal sampler to sample this signal when an in-call incoming signal notification signal is included in the line; a response signal emitter to send a response signal for the in-call incoming signal notification signal to the line; and a control portion to measure the duration of the sampled signal of the in-call incoming signal notification signal sampler, to determine that an in-call incoming signal notification signal is present when this is greater than or equal to than a prescribed time t1, less than or equal to a prescribed time t2 and cause the response signal emitter to send a response signal, and to acquire information.

The telecommunications device equipped with the in-call incoming signal notification function relating to the present invention is equipped with a control portion which, when the duration of the sampled signal is less than the prescribed time t1 or greater than the prescribed time t2 and the response signal is not sent, thereafter measures the duration of the sampled signal attained once more, determines that an in-call incoming signal notification signal is present, when this is greater than or equal to a prescribed time ta, less than or equal to a prescribed time tb (ta<t1, t2<tb), causes the response signal emitter to send a response signal, and acquires information.

In the telecommunications device equipped with the in-call incoming signal notification function relating to the present invention, the first prescribed time t1 is 25 ms and the second prescribed time t2 is 55 ms.

In the telecommunications device equipped with the in-call incoming signal notification function relating to the present invention, the in-call incoming signal notification signal sampler comprises a filter to sample the in-call incoming signal notification signal, an integrating circuit to integrate the output of the filter, and a comparator to convert the output of the integrating circuit to a binary signal based on predetermined conditions; the integrating circuit has a time constant which is longer than the sampling interval for the control portion to measure the duration of the sampling signal and shorter than the duration of the in-call incoming signal notification signal.

In the telecommunications device equipped with the in-call incoming signal notification function relating to the present invention, the integrating circuit has a time constant roughly the same as the sampling interval, for example.

The method for detecting in-call incoming signal notification relating to the present invention is a method for detecting in-call incoming signal notification for the telecommunications device of the first subscriber to attain identification information of a third subscriber when a first subscriber is talking with a second subscriber via an converter comprising: a process to sample this signal when an in-call incoming signal notification signal is included in a line; a process to measure the duration of the sampling signal of the in-call incoming signal notification signal sampler and determine that an in-call incoming signal notification signal is present when this is greater than or equal to a prescribed time t1, less than or equal to a prescribed time t2; a process to send a response signal for the in-call incoming signal notification signal to the line when it was determined that the in-call incoming signal notification signal is present; and a process to acquire information from the line.

BRIEF DESCRIPTION OF THE DRAWINGS

FIG. 2 is a timing chart to explain the action of the device relating to the mode of the embodiment of the present invention;

DESCRIPTION OF THE PREFERRED EMBODIMENTS

First mode of the embodiment of the present invention

Next, the best mode for carrying out the invention will be explained using the figures.

In view of the fact that the in-call incoming signal notification tone CAS (Customer Equipment Alerting Signal) for displaying a third party's ID during a call is sent from the exchange in the form of a prescribed dual tone with a duration of 75 to 85 ms, this device decreases the false detection rate without reducing the detection rate by making [the determination of] whether a received signal is CAS not simply by the identification of a dual tone signal, but with other conditions, for example, the presence of a microphone or earphone signal, whether those signals are sent repeatedly, or whether the continuous reception time of those signals is included.

Figure 1:
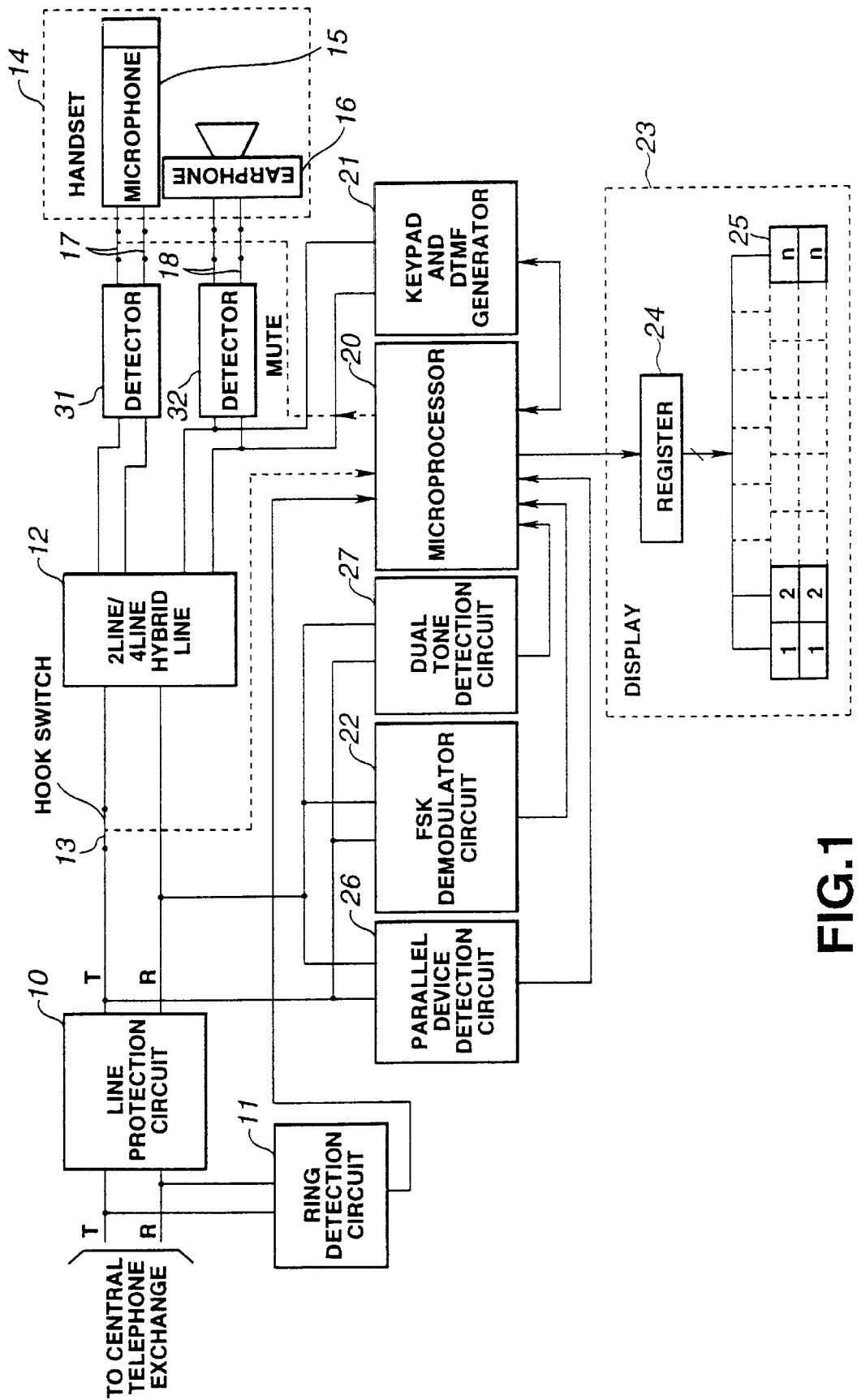
FIG. 1 is a block diagram of the function of the telephone equipped with the in-call incoming signal notification device relating to the mode of the embodiment of the present invention.

FIG. 1 is a block diagram of the function of a telephone equipped with the in-call incoming signal notification device relating to the mode of the embodiment of the present invention.

This device comprises a ring detector circuit 11 to generate a signal to inform a subscriber of an incoming call and a line protection circuit 10 connected thereto. This line protection circuit 10 is connected to a 2/4 line hybrid circuit 12 via a hook switch 13. This hybrid circuit 12 is connected to a earphone/microphone 14 comprising both a microphone (transmitting converter: for example a microphone) 15 and an earphone (receiving converter: for example speaker, receiver) 16. In this case the hybrid circuit 12 is connected to the microphone 15 and the earphone 16 via switches 17 and 18 which are discussed below.

This device comprises a control circuit constituted of a microprocessor (microcomputer) 20, keypad and DTMF (Dual Tone Multi Frequency) generator 21, FSK (Frequency Shift Keying) demodulator circuit 22, parallel device detection circuit 26 connected to a chip and ring conductor, dual tone detection circuit 27, register 24, and display 23 including a visual display unit 25 comprising one or more rows each having from 1 to n cells. The parallel device detection circuit 26 generates a signal to indicate whether this device is connected to an off-hook extension telephone device. The dual tone detection circuit 27 detects the presence of a dual tone signal such as a DTMF signal when a voice signal is present on the subscriber loop. The two circuits, the parallel device detection circuit 26 and the dual tone detection circuit 27, are realized with a one chip integrated circuit, for example the MT8843 from Mitel Company.

The microprocessor 20 functions as a control center for the subscriber device and responds to signals from the ring detection circuit 11, FSK demodulator 22, parallel device detection circuit 26, dual tone detection circuit 27 and hook switch 13; it supplies control signals to the mute switches 17 and 18, keypad and DTMF generator 21, and display 23.

Also, detectors 31 and 32 are established between the hybrid circuit 12 and the microphone 15 and earphone 16 respectively. The detectors 31 and 32 detect the presence of voice signals on the connecting lines to the microphone 15 and the earphone 16.

The device of this mode of the embodiment minimizes false detection in the CALLER ID on CALL WAITING service discussed before with the addition of the voice detector 32 on the reception side and the voice detector 31 on the transmission side and by processing with the microprocessor 20.

The action is explained next.

It is presumed that a subscriber is talking with a second subscriber via the central telephone exchange and a third subscriber is trying to call the first subscriber.

The call from the third subscriber is detected and the central telephone exchange prepares the off-hook incoming call procedure. This is shown by the guard band TG1 of X (milliseconds) ms in FIG. 2(a). During this period, the call processor at the central telephone exchange executes the call processing software program relating to that device. The in-call incoming signal notification tone CAS (Customer Equipment Alerting Signal) for indicating a third party is transmitted during a prescribed time t1 (for example, 80 to 85 ms). CAS is a prescribed dual tone signal (for example, a DTMF signal of 2.1 kHz and 2.7 kHz. When voice signals are present at this time, it is difficult to correctly detect the dual tone signal CAS.

The microprocessor 20 of the subscriber device detects the off-hook state of the subscriber device in the same way as [it detects] telephone extension devices connected to the subscriber device. During the t1 period, the dual tone detection circuit 27 detects the presence of in-call incoming signal tone and notifies the microprocessor 20 of this. The microprocessor 20 mutes the microphone 15 and the earphone 16 in the handset 14 (after CAS reception, only transmission is muted) via switches 17 and 18 and executes the control loop procedure. When this process is not performed, it is very troublesome for the subscriber when the central telephone exchange sends a burst of modem data.

The microprocessor 20 determines the state of the telephone extension devices, signals the keypad and DTMF generator 21, generates an acknowledge (ACK) signal t3 to the subscriber loop after a prescribed time t2 following CAS (for example, 30 to 50 ms), and notifies the central telephone exchange that this telephone is able to receive caller's number identification data.

When the telephone extension device is in an off-hook state, the microprocessor 20 halts the generation and transmission of the acknowledge signal and the data transmission procedure at the central telephone exchange is completed. Moreover, when the as t3 is not transmitted, CAS is sent once more as shown in FIG. 2(b).

During a prescribed period of time t4 (for example 50 ms), the subscriber device makes preparations for data reception and the central telephone exchange makes preparations for data transmission. The signaling method and format and definitions of messages and parameters are determined by prescribed standards. The time period t5 portion is constituted of X ms (for example 150 ms) of logic 1 data in order for transmission of confirmation data and inspection of the FSK demodulator 22. This confirmation data is transmitted in the time period t6 which depends on the amount of data transmitted. This data corresponds to the telephone number and name of the third subscriber, data, and time, etc. The FSK data is received by the FSK demodulator circuit 22 and is there converted to a digital bit stream and provided to the microprocessor 20. The microprocessor 20 converts this data to information displayed with the display 23.

Afterwards, the subscriber confirms the identity of the calling subscriber and decides whether to receive the incoming call during the present call. In the case where the subscriber wants to receive the incoming call during the present call, the subscriber may simply press the switch as before. Meanwhile, when the subscriber does not want to receive the incoming call during the present call, the subscriber may ignore the in-call incoming signal tone. If the subscriber ignores the in-call incoming signal tone, the central telephone exchange generates a second in-call incoming signal notification tone after a prescribed period of time. However, data transmission is not repeated if the first transmission was not correctly received; in the case where it is correctly received the acknowledge signal t3 is generated but if not, the acknowledge signal t3 is not generated.

During the short time t7, circuits on both ends make preparations for returning to normal action. The microprocessor 20 cancels the muting by the reception/transmission converters 15 and 16 on the handset 14 and normal voice communication is restarted. The time interval discussed above is arbitrary and can be preset to a value which does not countermand appropriate action.

However, this mode of the embodiment has the object of correctly detecting CAS in FIG. 2(a) even when signals such as voice signals are superimposed on each other.

Now, when the tone signal is detected with the two tone detection circuit 27, the detector 31 on the transmission side is engaged in detecting voice and the detector 32 on the transmission side is not engaged in detection as in FIG. 2(c) and (d). Because in this state the detector 32 is not engaged in detecting, although the two tone detection circuit 27 detected a tone signal, it can be determined that this tone signal was not a signal sent from the central telephone exchange, but was input with the microphone 15 or generated within this device. Consequently false detection due to the speakers' voices can be prevented.

On the other hand, when the two tone signal is detected with the two tone detection circuit 27, this detection is clearly correct if both the transmission side detector 31 and the reception side detector 32 are not engaged in detection (however, the voice detection circuit on the reception side shows detection only during the reception of the two tone signal).

In this way, false detection can be minimized through comprehensive processing by the microprocessor 20 of the signals output from the two tone detection circuit 27 and the transmission side detector 31 and the reception side detector 32.

Figure 4:
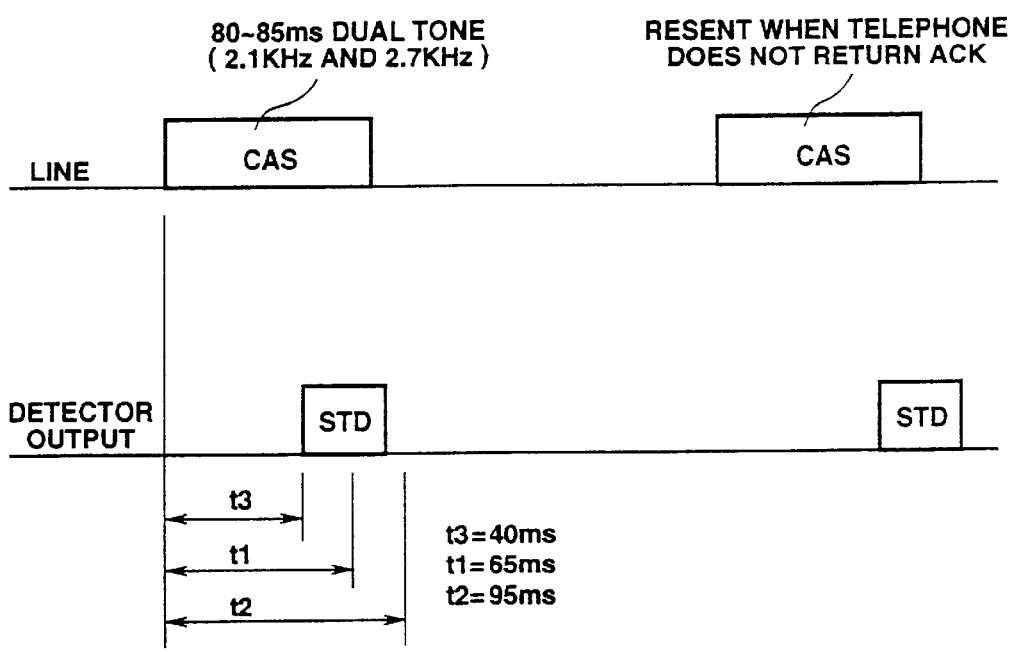
FIG. 4 is a timing chart to explain the action of a second mode of the embodiment of the present invention.

Moreover, the microprocessor 20 determines the detection of the two tone signal based on the STD signal (FIG. 2(e)) output by the two tone detection circuit 27. This STD signal is delayed about 40 ms from the CAS. The details are discussed below. Second mode of the embodiment of the present invention In the procedure shown in FIG. 2(b), the two tone signal is detected with the two tone detection circuit 27, processed with the microprocessor 20, and the signal is returned from the DTMF generator 21. The two tone signal is sent once more in a specified time even if there is a failure for some reason and the signal cannot be returned from the DTMF generator 21. The timing chart in FIG. 4 shows this situation. The 80 to 85 ms dual tone signal CAS, having components 2.1 kHz and 2.7 kHz, is transmitted on the line. In response to this CAS, the dual tone detection circuit 27 outputs the STD signal in FIG. 4 somewhat later than that. The microprocessor 20 effects detection based on this STD signal. The details of detection are discussed below. When the microprocessor 20 does not detect or detects but does not return ACK, CAS is sent from the line once more.

This second mode of the embodiment reduces false detection using this situation. In other words, when the same signal is detected repeatedly, ACK is returned first. The frequency of repetition may be two or more.

Figure 3:
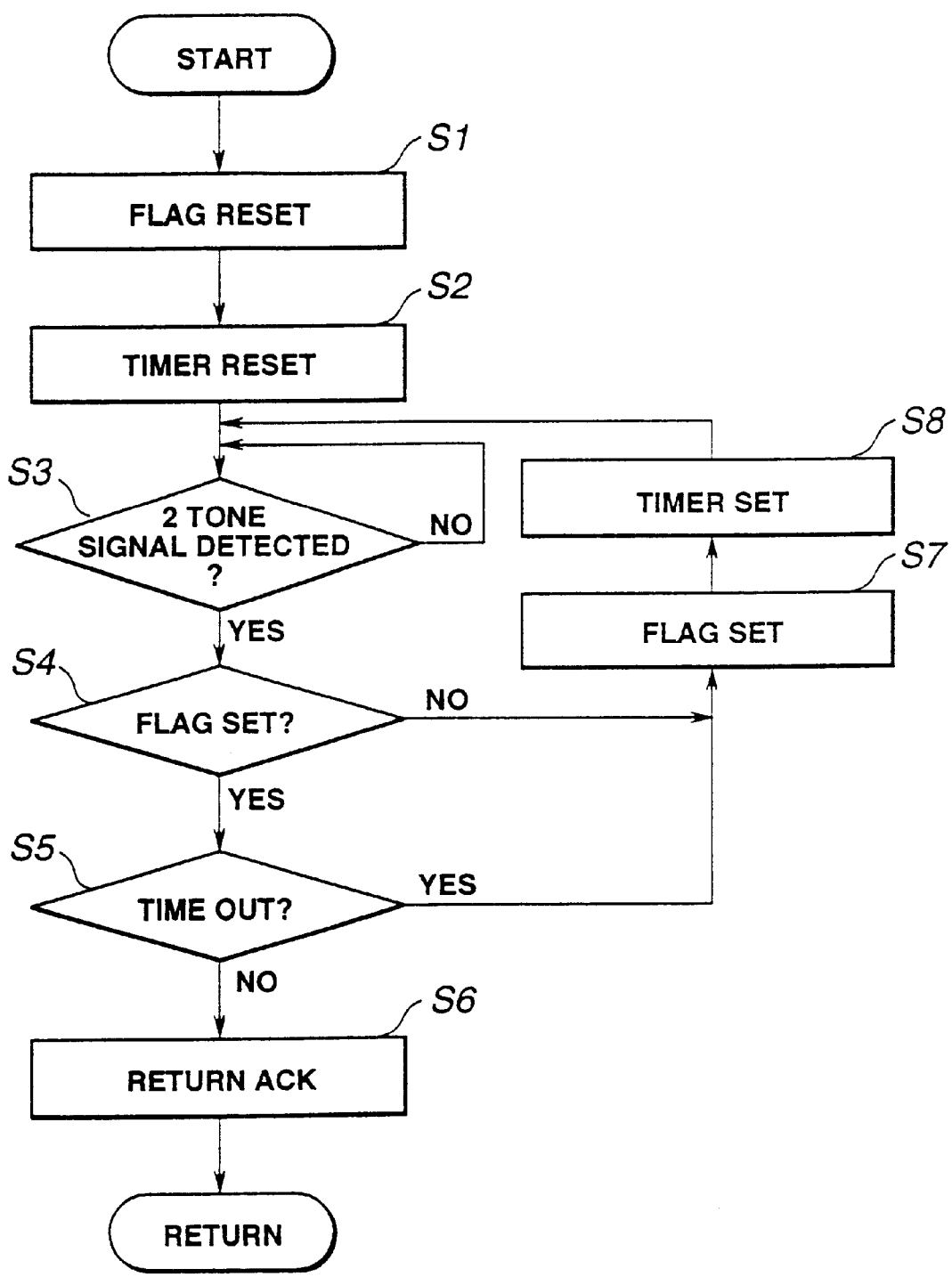
FIG. 3 is a flowchart to explain the action of a first mode of the embodiment of the present invention.

The action is explained using the flowchart in FIG. 3.
S1: Reset flag.
Resets flag for CAS detection.
S2: Reset timer.
Resets timer to determine whether the detected CAS is the second one or the first.
S3: Two tone signal detected?
Advances to step S4 when the microprocessor 20 detects a two tone signal.
S4: Is flag set?

When the two tone detection circuit 27 has first detected a signal, it is highly probably that this is a false detection. Therefore, the microprocessor 20 merely causes that [fact] to be stored in a flag for the first two tone signal and does not return ACK. In other words, when the flag is not set (NO), the two tone signal is the first signal so the process advances to steps S7 and S8 and a flag is set to show that a first two tone signal was received; meanwhile the timer, to determine whether the two tone signal received next is a second two tone signal was resent by the central telephone exchange since the first was ignored, is set. When the flag is set (YES), the process advances to step S5.
S5: Time out?

In S4, it was determined that a two tone signal was received already, and it is determined whether the two tone signal received here is really the second one. In the case where the detected signal from the two tone detection circuit 27 arrived (NO) after a time set with the timer was past, the signal which arrived initially is determined to be a false detection. At this time, the process advances to steps S7 and S8, the arrival of a two tone signal is newly stored by the microprocessor 20, and the process waits for detection after a certain time period in the same way. When that is not the case (NO), the process advances to step S6.
S6: Returns ACK.

With the process from S3 to S5, it is determined that two CAS were detected within a predetermined time (value established in standards, for example, after several seconds). In this case, the presence of the CAS is certain. ACK is then returned and the prescribed processing as discussed above is effected. In other words, the signal is returned form the DTMF generator and preparations are made to receive data such as the name and telephone number of a third party.

Even if some errors occur in the detection of individual CAS, the reliability of CAS detection is made very high through repeated detection of CAS in this way.

Third mode of the embodiment of the present invention
The device of the first mode of the embodiment of the invention realizes a reduction in false detection with the detectors 31 and 32. The method of the second mode of the embodiment of the invention increases reliability by repeated detection of CAS. Instead of these detectors 31 and 32 or repeated detection, or both, it is possible to decrease false detection by constituting the two tone detection circuit 27 as follows.

Figure 5A:
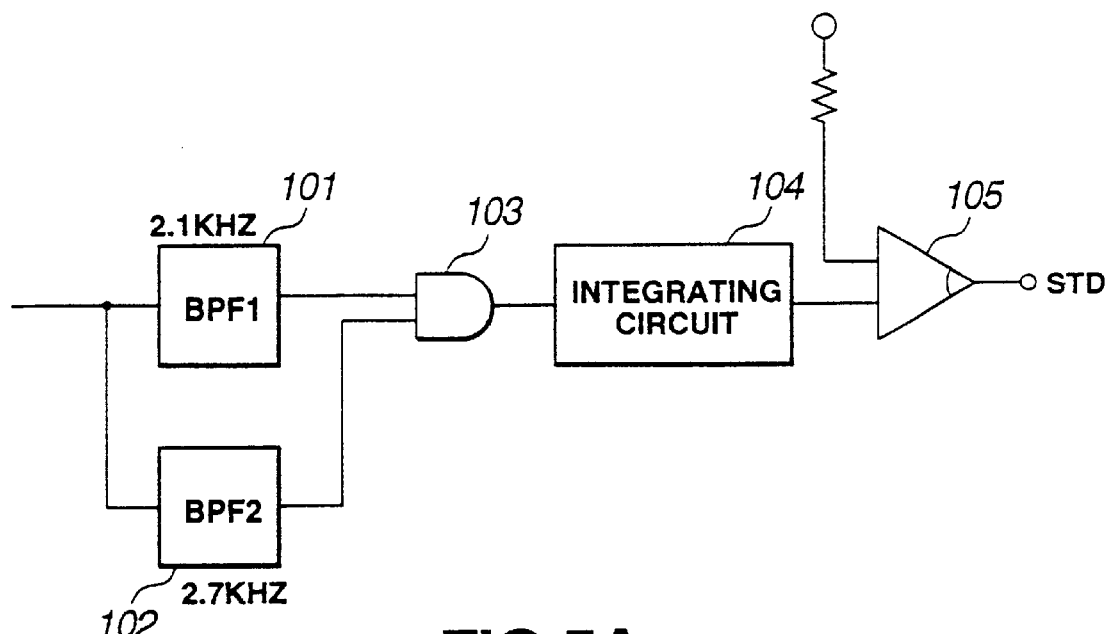
FIG. 5 is part of a block diagram of the function of the in-call incoming signal notification device of a third mode of the embodiment of the present invention.
Figure 5B:
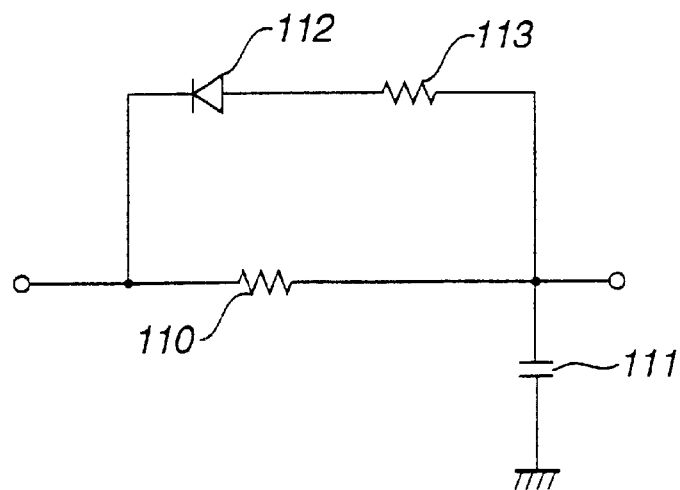

As discussed before, the FSK demodulator circuit 22 and the dual tone detection circuit 27 are realized with a one chip integrated circuit, for example the MT8843 from Mitel Company. This integrated circuit houses a circuit to convert a line signal to an STD signal for detecting CAS. FIG. 5(a) shows a block diagram of the function of this circuit. This circuit comprises a band pass filter (BPF) 101 to sample the 2.1 kHz tone signal which constitutes the two tone signal and a band pass filter (BPF) 102 to sample the 2.7 kHz tone signal. After the output of these filters 101 and 102 is synthesized by the adder 103, the high frequency component is cut with the integrating circuit 104. The output of the integrating circuit 104 undergoes waveform shaping with the comparator 105 and is output as the STD signal. FIG. 5(b) shows an example of the internal structure of the integrating circuit 104. The time constant of the integrating circuit 104 is determined by the resistor 110 and the capacitor 111. The diode 112 and resistor 113 promote the discharge of the capacitor 111 and serve to shorten the fall time of the STD signal.

Figure 6:
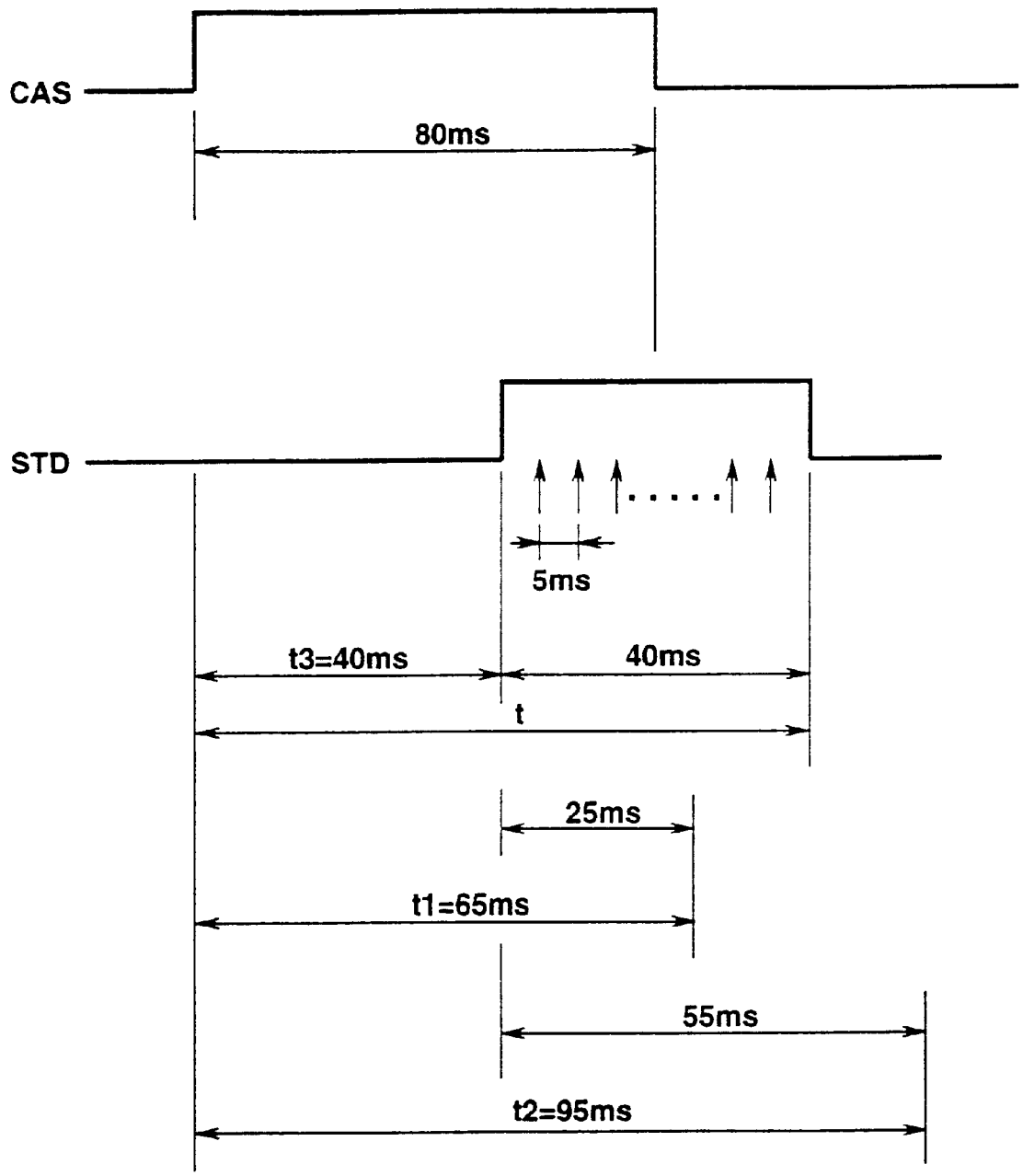
FIG. 6 is a timing chart to explain the action of a third mode of the embodiment of the present invention.

FIG. 6 shows a timing chart of the CAS signal and STD signal. With the integrating circuit 104, the STD signal is made later than by CAS signal by the prescribed time t3. Also its width becomes shorter than the duration of the CAS signal. The microprocessor 200 measures the length t of the STD signal according to the count when the H period of the STD signal is sampled at the prescribed intervals (5 ms).

According to the manual for this integrated circuit, the total recognition time is shown as tREC=tGP+tDP. Here, tGP is tone present guard time; tDP is tone present detect time. The total tone absent time is shown as tABS=tGA+tDA. Here, tGA is tone absent guard time and tDA is tone absent detect time.

The tone detection signal recognition time in the idle state is set no smaller than 20 ms when both tones are used in detection. In other words, both tones must be detected during a period of at least 20 ms before the signal is effective. This is satisfied if tGP is set to at least 20 ms.

Also, TE is determined when 15 to 25 ms from the switching of the signal is required for applying DC waiting pulse and AC load. If tABS=tDA+tGA is from 15 to 25 ms, DC current waiting pulse and AC load both are applied at the fall edge of the StD. The maximum value of tDA is 8 ms and tGA becomes 15 to 17 ms. Consequently tGP must be greater than tGA.

However, false detection actually occurs under such timing conditions. For example, when voice signals are mixed in CAS, especially women's high voices, this causes interference with the 2.1 kHz and 2.7 kHz two tone signal, detection becomes impossible, and false detection occurs.

The method of adjusting level and the method of changing the band of the two tone signal are being considered in order to resolve this problem. However, the former method did not work well in experiments. The latter method is difficult because the frequency of the two tone signal is determined by the standards.

Then, the method of adjusting the time constant of the integrating circuit 104 in the circuit in FIG. 5 was considered. The case of reducing and the case of increasing the time constant with a standard time constant as the center is considered. In the former case, the detection rate increases, but the false detection rate becomes poor. In the latter case, oppositely, the detection rate worsens, but the false detection rate is reduced.

On the other hand, the STD signal is sampled at 5 ms intervals as shown in FIG. 6; therefore, it is possible to improve the false detection rate without reducing the detection rate. Moreover, the integrating circuit must have a time constant of 5 ms or more according to the sampling interval.

Based on this, the time constant must be reduced in order to improve the detection rate and a device added to the sampling of the STD signal in order to reduce the false detection rate. In other words, combining the measurement of the duration of the STD signal by the microprocessor 20 and the integrating circuit makes it possible to improve both the false detection rate and detection rate at the same time. Before now it was impossible to improve the characteristics of both because of the stoppage of the adjustment of part of the detection circuit 27. Moreover, the time constant of the integrating circuit may be 5 ms or greater is preferably as short as possible.

The microprocessor 20 samples the "H" time of the STD signal, produced on the basis of the output of this integrating circuit, every 5 msec. When the "H" duration of the STD signal enters the 25 m to 55 ms range, the microprocessor 20 recognizes this as CAS and returns ACK. When the STD duration is less than 25 msec or greater than 55 msec, it is a reaction to voice and is ignored.

Figure 7:
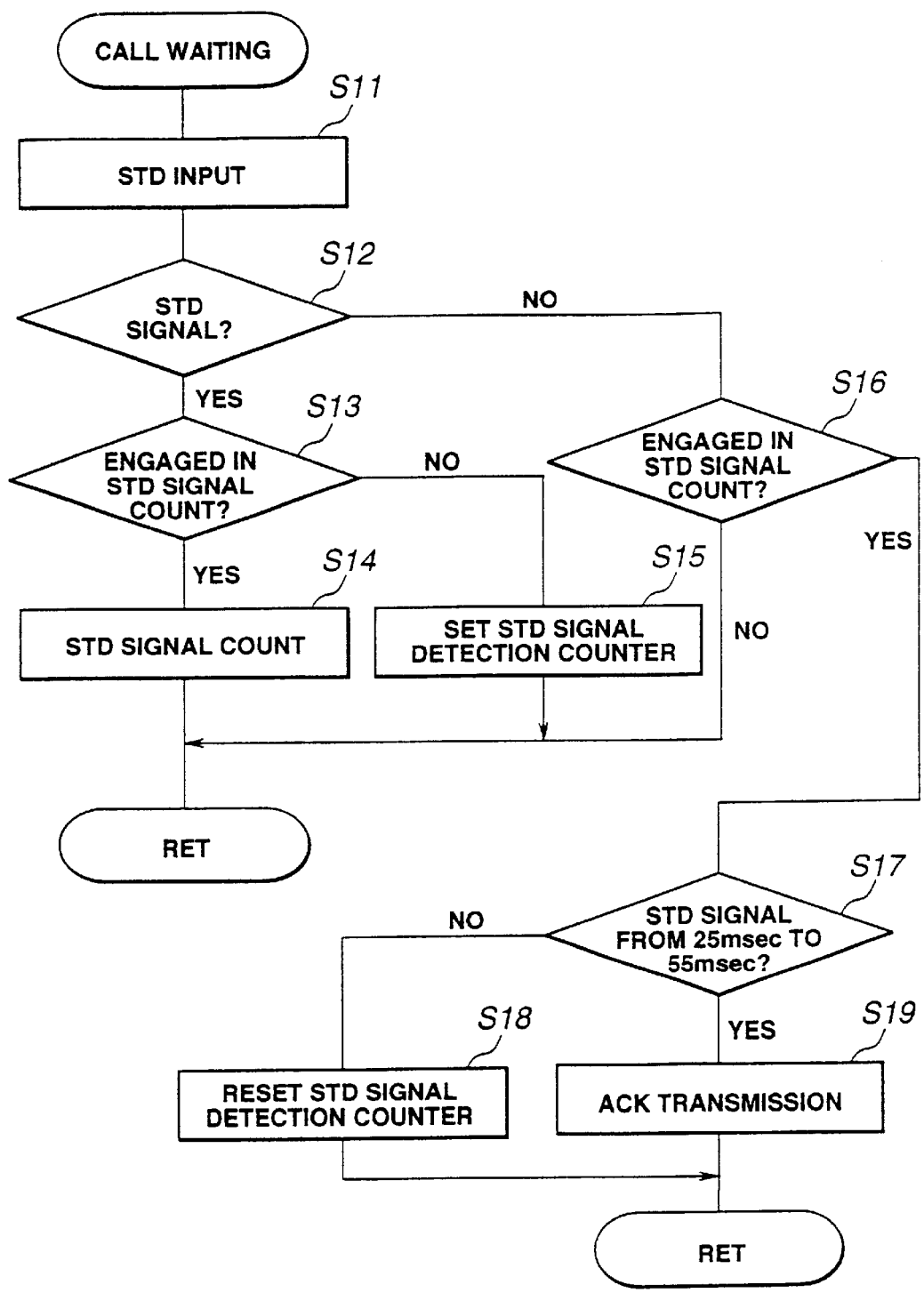
FIG. 7 is a flowchart to explain the action of a third mode of the embodiment of the present invention.

The actual processing by the microprocessor 20 is explained using the flowchart in FIG. 7.

S11: STD input
  Microcomputer checks STD input.
S12: Has STD signal?
  Determines whether there is an STD signal. When there is an STD signal (YES), the process advances to step S13. When not (NO), the process advances to step 516.
S13: Engaged in STD signal count?
  Determines whether process is engaged in counting STD signal. When engaged in count (YES), the process advances to step S14. When not (NO), the process advances to step S15.
S14: STD signal count
  Counts STD signal at 5 ms intervals and measures duration of "H" level portion thereof.
S15: Set STD signal detection counter
  Sets counter and starts count of "H" level portion of STD signal.
S16: Engaged in STD signal count
  Determines whether engaged in counting STD signal. When engaged in count (YES), the process advances to step S17. When not (NO), the process returns to original routine.
S17: Is STD signal from 25 msec to 55 msec?
  Checks the duration of the STD signal and determines whether this is in the range of 25 msec or greater and 55 msec or lower. When within this range (YES), the process advances to step S19.
  When not (NO), the process advances to step S18.
S18: Resets STD signal detection counter
  Resets counter and prepares for next detection.
S19: ACK transmission
  Returns ACK since it has determined that CAS signal was received.

Below is a simple explanation of how the microprocessor 20 works for each state of the STD signal.

(1) When no STD signal

Processing for S11, S12, and S16 is effected, returns to original routine. When waiting for STD signal, these processes are repeated.

(2) When STD signal is input

Processing for S11, S12, S13, and S15 is effected. Counter is reset in step S15 since counting of STD signal is effected.

Then, processing for S11, S12, S13, and S14 is effected and STD signal count processing is started.

(3) When STD signal disappears

Processing for S11, S12, S16, and S17 is effected. In step S17, it is determined whether the processing time of the STD signal is within a prescribed range (25 msec to 55 msec). If within the prescribed range, ACK is returned (S19). If not, the counter is reset (S18) and the microprocessor 20 waits for the input of the STD signal once more.

Next are shown the results of an experiment to compare the case where this method is applied and the case where the conventional method is applied. In the experiment, the test signal used was 24 (one hour each) test tapes from Belcore edited to five minutes. Voice signals and other signals such as music were recorded on these test tapes, but the tapes did not include CAS signals. When these test tapes were played back repeatedly using a minidisk, the average level of the speech level of those tapes was adjusted and the test was conducted using five types of levels.

The results of the experiment are as follows. Each numerical value shows the frequency of false detection.

| Line voice signal level (Vp-p) | 0.6 | 0.9 | 1.2 | 1.5 | 2.0 |
|---|---|---|---|---|---|
| Conventional method | 5 | 20 | 40 | 43 | 40 |
| Method of third mode of the embodiment | 0 | 0 | 0 | 3 | 6 |

As clear from these results, the method of third mode of the embodiment has a much lower percentage of false detection and is much superior to the coventional method. Using the method of third mode of the embodiment, the false detection rate is expected to be from a small fraction to one tenth, even if the voice levels are high and conditions are poor. Also, if the voice levels are not very high and the conditions are good, it is expected that false detection will not occur when there are no hindrances in practical use.

Next, an experiment was conducted for the detection rate of the CAS signal. These test tapes included only signals such as voice, and a CAS signal was superimposed on these and used as the test signal. The playback level of the test tape was 1 Vp-p and a -22 dBm CAS signal was superimposed thereon. Moreover, in this experiment, CAS was detected, ACK was returned, and it was checked whether the converter could detect this ACK. Consequently, the results of the experiment include the detection of ACK by the converter as well as the detection of the CAS signal on the telephone side. Also, voice signals were superimposed in both the case of CAS signal detection by the telephone and ACK signal detection by the converter. In this respect, the experimental conditions differ from a real usage state; the conditions of this experiment were quite severe. In other words, when the CAS signal is detected, the converter effects a muting action for the terminal while muting the voice signals; therefore, the CAS signal is not superimposed on a voice signal. In the same way, when the ACK signal is detected, the terminal mutes the voice signals; therefore, the ACK signal is not superimposed on a voice signal. In this way, this experiment was effected under very severe conditions for a comparison of the two methods.

The results of the experiment are as follows.

| | Percentage of false detection |
|---|---|
| Conventional method | 72.20% |
| Method of third mode of the embodiment | 31.10% |

As understood from these results, the probability of false detection can be suppressed to less than half with the method of third mode of the embodiment. As discussed before, this experiment includes the converter and was conducted under conditions which are much more severe than the actual usage state; therefore, false detection will mostly not occur in the actual usage state and even if they occur by chance, the frequency of that occurrence is expected to become less than half that of before with the method of third mode of the embodiment.

As clear from the experimental results, with the method of the third mode of the embodiment, voice is almost never falsely detected as a CAS signal and a CAS signal superimposed on voice can be detected with a high probability. The third mode of the embodiment is a very superior method for detecting CAS signals.

As above, with the method of the third mode of the embodiment, both the detection rate and the false detection rate can be improved at the same time by combining the setting of the time constant of the integrating circuit and the processing by the microprocessor 20 to determine STD signal.

Moreover, the third mode of the embodiment can use those independently or in combination. When used in combination, the detection rate and false detection rate are further improved compared to the case of independent usage.

In this case, the initial CAS detection conditions, of 25 ms or more and 55 ms or less, are relaxed in the second detection; this makes no difference in detection even in the case where conditions are substantially different. False detection are very rare even if the detection conditions are more lax for the second time, because it is not considered that the same type of signal would be received twice consecutively due to the effects of noise, etc. If a CAS signal which diverges somewhat from the standards due to the problems of the converter and line, etc., is transmitted, correct processing can be effected due to the relaxation of the second conditions in this way.

As above, the present invention can decrease the false detection rate without reducing the detection rate due to integrated processing of the in-call incoming signal, microphone signal, and earphone signal on the line.

Also, with the present invention, the reliability of detecting in-call incoming signal notification signals can be greatly increased through integrated processing of a plurality of in-call incoming signal notification signals transmitted repeatedly, even if there are some errors in the individual detection processes.

Also, with the present invention, both the detection rate and false detection rate can be improved at the same time through combining the setting of the time constant of the integrating circuit which processes the in-call incoming signal notification signals and the processing for determining sampled signals by the control portion.

What is claimed is:

1. A telecommunications device equipped with an in-call incoming signal notification function, comprising:

a microphone for transmitting voice signals to a line;

an earphone for receiving voice signals from said line and convert them to voice;

an in-call incoming signal notification signal sampler for sampling an in-call incoming signal notification signal when the in-call incoming signal notification signal is included in said line;

a response signal emitter for sending a response signal for said in-call incoming signal notification signal to said line;

a microphone signal detector for detecting whether said microphone has sent voice signals to said line;

an earphone signal detector for detecting whether said earphone has received voice signals from said line; and a control portion for analyzing the sampled signal from said in-call incoming signal notification signal sampler based on the detected signals of said microphone signal detector and said earphone signal detector and determining the presence of said in-call incoming signal notification signal, as well as causing said response signal emitter to send a response signal when it is determined that said in-call incoming signal notification signal is present and for acquiring information from said line.

2. The telecommunications device equipped with an in-call incoming signal notification function, according to claim 1, wherein said control portion determines that there is no said in-call incoming signal notification signal regardless of the sampled signal of said in-call incoming signal notificaiton signal sampler, when said microphone signal detector detects voice signals and said earphone signal detector does not detect voice signals; and determines that there is said in-call incoming signal notification signal when both said microphone signal detector and said earphone signal detector do not detect voice signals and the sampled signal of said in-call incoming signal notification signal sampler is output.

3. A method for detecting in-call incoming signal notification, being a method for detecting in-call incoming signal notification for the telecommunications device of a first subscriber for attaining identification information of a third subscriber when said first subscriber is talking with a second subscriber via a converter, comprising:

(a) a process for sampling an in-call incoming signal notification signal when the in-call incoming signal notification signal is included in a line;

(b) a process for detecting whether a microphone sent a voice signal to said line;

(c) a process for detecting whether an earphone received a voice signal from said line;

(d) a process for analyzing the sampled signal sampled in said process (a) based on the detection results of said processes (b) and (c) and for determining the presence of said in-call incoming signal notification signal;

(e) a process for sending a response signal for said in-call incoming signal notification signal to said line when it was determined that said in-call incoming signal notification signal is present; and (f) a process for acquiring information from said line.

4. A telecommunications device equipped with the in-call incoming signal notification function comprising:

a microphone for sending voice signals to a line;

an earphone for receiving voice signals from said line and converting them to voice;

an in-call incoming signal notification signal sampler for sampling an in-call incoming signal notification signal when the in-call incoming signal notification signal is included in said line;

a response signal emitter for sending a response signal for said in-call incoming signal notification signal to said line; and a control portion for measuring the duration of the sampled signal of said in-call incoming signal notification signal sampler, for determining that said in-call incoming signal notification signal is present when this is greater than or equal to a prescribed time t1, less than or equal to a prescribed time t2 and causing the response signal emitter to send a response signal, and for acquiring information;

wherein the control portion, when the duration of said sampled signal is less than said prescribed time t1 or greater than said prescribed time t2 and said response signal is not sent, measures the duration of the sampled signal attained once more, and determines that said in-call incoming signal notification signal is present; when this is greater than or equal to a prescribed time ta, less than or equal to a prescribed time tb (ta<t1, t2<tb), causes said response signal emitter to send a response signal, and acquires information.

5. A telecommunications device equipped with the in-call incoming signal notification function comprising:

a microphone for sending voice signals to a line;

an earphone for receiving voice signals from said line and converting them to voice;

an in-call incoming signal notification signal sampler for sampling an in-call incoming signal notification signal when the in-call incoming signal notification signal is included in said line;

a response signal emitter for sending a response signal for said in-call incoming signal notification signal to said line; and a control portion for measuring the duration of the sampled signal of said in-call incoming signal notification signal sampler, for determining that said in-call incoming signal notification signal is present when this is greater than or equal to a prescribed time t1, less than or equal to a prescribed time t2 and causing the response signal emitter to send a response signal, and for acquiring information;

wherein said first prescribed time t1 is 25 ms and said second prescribed time t2 is 55 ms.

* * * * *